Dec. 4, 1962    R. W. HOFFMAN    3,066,777
CLUTCH MECHANISM
Filed April 13, 1960    4 Sheets-Sheet 1

INVENTOR.
ROBERT W. HOFFMAN
BY Ernest L. Brown
ATTORNEY

Dec. 4, 1962    R. W. HOFFMAN    3,066,777
CLUTCH MECHANISM

Filed April 13, 1960    4 Sheets-Sheet 3

INVENTOR.
ROBERT W. HOFFMAN
BY Ernest L. Brown
ATTORNEY

Dec. 4, 1962   R. W. HOFFMAN   3,066,777
CLUTCH MECHANISM

Filed April 13, 1960                                   4 Sheets-Sheet 4

*INVENTOR.*
ROBERT W. HOFFMAN
BY Ernest L. Brown
ATTORNEY

United States Patent Office 3,066,777
Patented Dec. 4, 1962

1

3,066,777
CLUTCH MECHANISM
Robert W. Hoffman, Wayland, Mich., assignor to
Lear Siegler, Inc., a corporation of Delaware
Filed Apr. 13, 1960, Ser. No. 21,925
2 Claims. (Cl. 192—38)

This invention pertains to a means for mechanically connecting a pair of coaxial rotatable members, and to means for at will disconnecting said members.

Ball screws are frequently used as actuators in servo systems in aircraft, and the like. The ball screws are usually driven by a prime mover of the electrical or hydraulic motor type. When the controls of the ball screws are defective, it is necessary to disengage the prime mover and its associated gearing in order manually to operate the ball screw. For example, the landing wheels of an aircraft are frequently cranked up and down by a ball screw. If the hydraulic motor is defective, it is desirable to be able to disengage the hydraulic motor and its gear train at the point of application of force to the landing wheels of the aircraft, namely, at the ball screw.

The device contemplated by this invention is a controllable ball clutch which is easily connected and disconnected at the ball screw.

It is, therefore, an object of this invention to provide a means for selectively connecting and disconnecting a pair of rotatable members, either one of which may be connected to a prime mover while the other is connected to a load.

It is another object of this invention to provide a novel controllable clutch.

It is still another object of this invention to provide a means for selectively connecting and disconnecting a ball screw from a prime mover.

Other objects will become apparent from the following description when taken in connection with the accompanying drawing in which.

Figure 1:
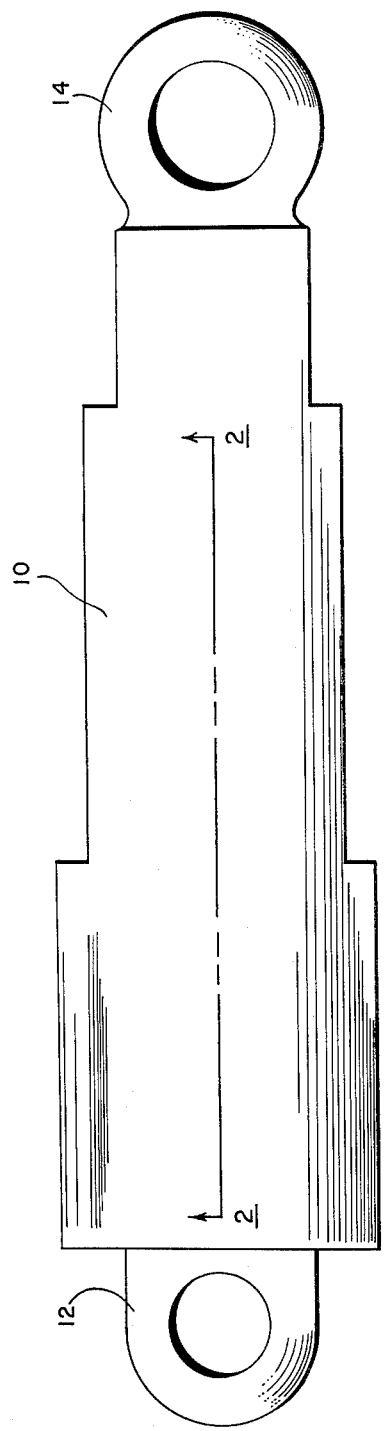
FIGURE 1 is a ball screw housing with the mechanism of this invention not shown.

FIGURE 1 shows a housing 10 which incloses a typical ball screw which is adapted to exert a force between eyelets 12 and 14 in accordance with the well known art.

Figure 2:
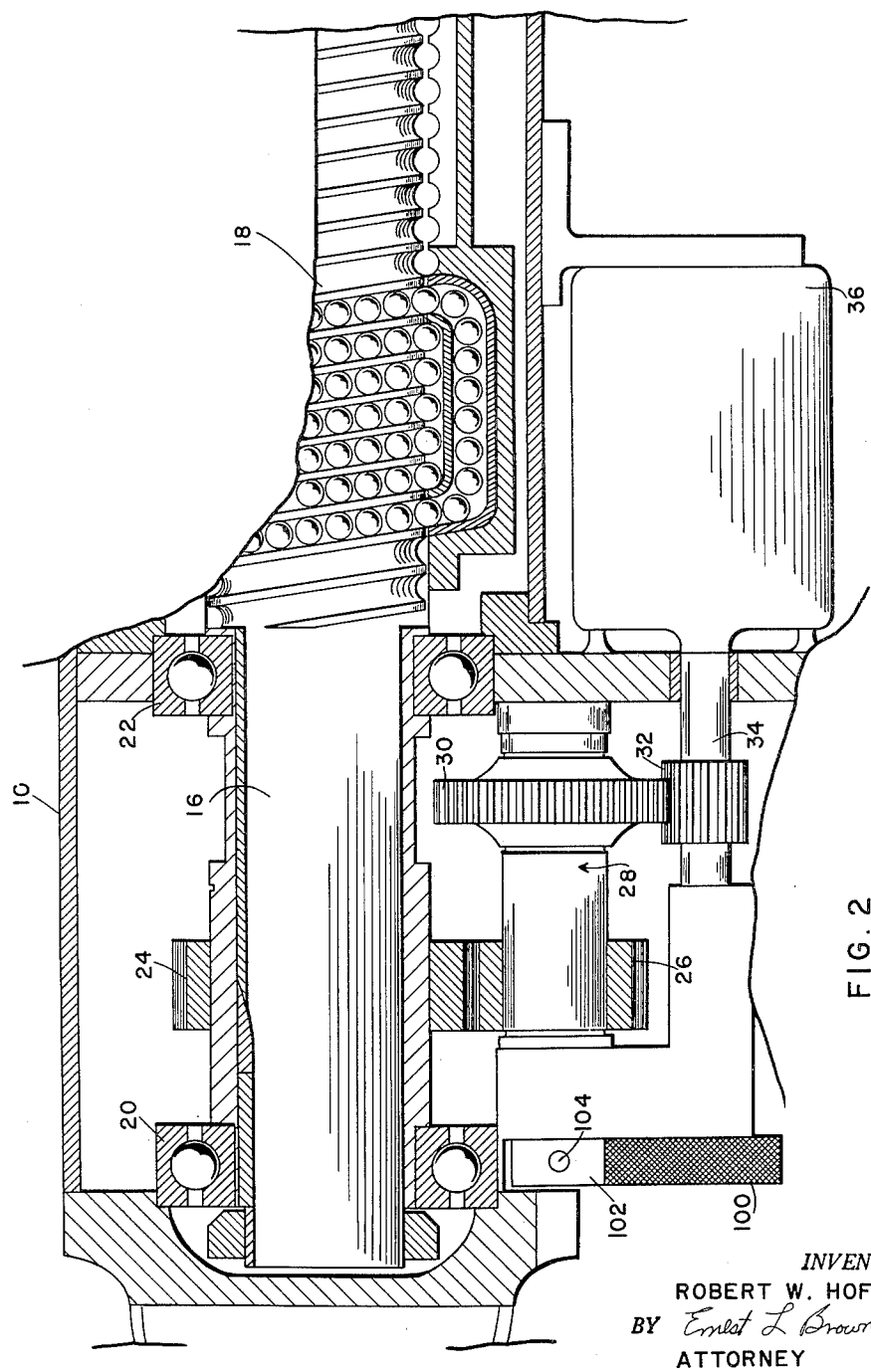
FIGURE 2 is a view, partially in section and partially in profile, taken at 2—2 in FIGURE 1 showing the details of a typical ball screw and its connection with a prime mover through the device of this invention.

In FIGURE 2, shaft 16 of ball screw 18 is positioned for rotation relative to housing 10 upon bearings 20 and 22. Gear 24 is connected to shaft 16 (for example by splines) to rotate therewith and to apply torque thereto. Gear 26 is mounted for rotation relative to housing 10 and engages gear 24. Gear 26 is connected through the mechanism of this invention (shown generally at 28) to input gear 30. Gear 30, mounted for rotation relative to mechanism 28 and to housing 10, engages gear 32 which is mounted upon a shaft 34 for rotation relative to housing 10. Shaft 34 is driven by prime mover 36 (for example an electric or hydraulic motor).

The structure and operation of the device of this invention which connects driving gear 30 to output gear 26,

2 at the option of the operator, may be understood by referring to FIGURES 3, 4, 5 and 6.

As shown in FIGURES 3, 4, 5 and 6, shaft 40 is positioned to slide relative to housing 10 in bearings 42 and 44. Spring 46 cooperates with shoulder 48 and collar 49 to bias shaft 40 toward its right limiting position. Ball bearing 56 is positioned along shaft 40 by means of spring keeper 50 and spacing member 58. Travel to the right of member 58 is limited by stop 52. A barrel cam 60 rides on the outer race of bearing 56 and has two cylindrical surfaces 62 and 64 which are radially and axially displaced from each other. Surfaces 62 and 64 are right circular cylinders coaxial with the axis of shaft 40. A transition surface 66 between surface 62 and surface 64 is a frustum of a right circular cone whose axis is coaxial with shaft 40. One end of barrel cam 60 has a ball retainer 68. The other end of barrel cam 60 is upset at 70 to cause barrel cam 60 to be rigidly attached to the outer race of bearing 56. Spring 47 biases shoulder 50, bearing 56, cam 60, and spacer 58 to the right. A rotatable sleeve 72, mounted for rotation on bearings 74 and 78, surrounds shaft 40, springs 46, 47, collars 49, 50 and barrel cam 60, and is radially spaced apart therefrom.

Spacing between gear 26 and bearing 78 is provided at 80 for the purpose of adjusting for mechanical tolerances and expansion due to temperature changes and the like.

Figure 3:
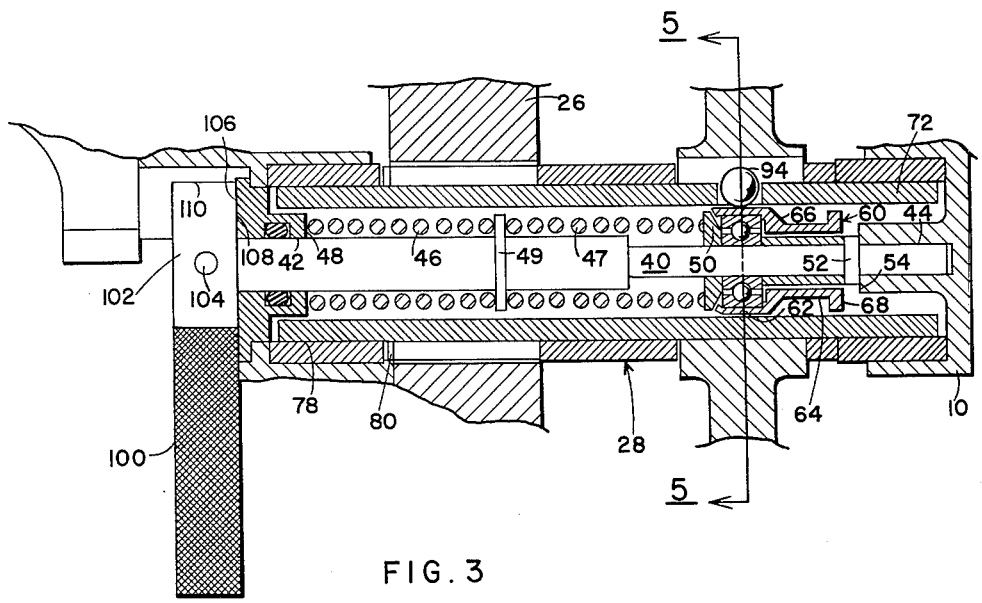
FIGURE 3 is a view, partially in section and partially in profile showing the device of this invention with the clutch engaged.
Figure 4:
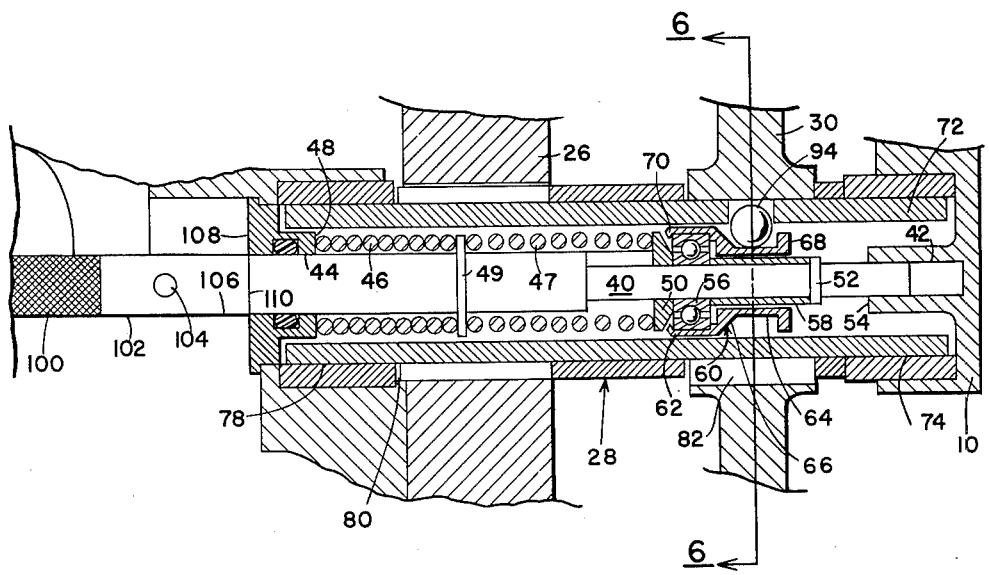
FIGURE 4 is a view, partially in section and partially in profile showing the device of this invention with the clutch disengaged.
Figure 5:
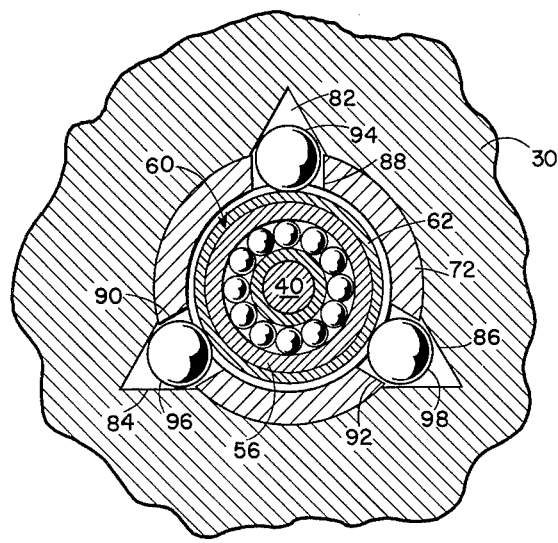
FIGURE 5 is a view, partially in section and partially in profile taken at 5—5 in FIGURE 3.
Figure 6:
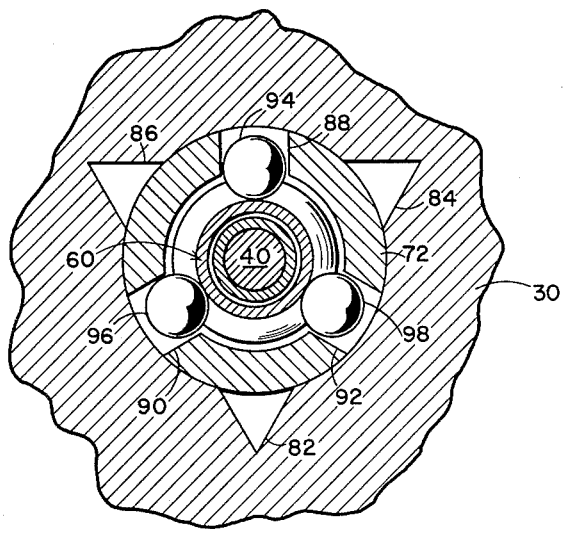
FIGURE 6 is a view, partially in section and partially in profile taken at 6—6 in FIGURE 4.

Gear 30 has one or more detents, and preferably at least three detents 82, 84 and 86, circumferentially arranged around the inner periphery of its hub, as shown more particularly in FIGURES 5 and 6. The faces of detents 82, 84 and 86 are inclined relative to a radial element of gear 30 so that a radial force is continually placed upon balls 94, 96 and 98 to urge them radially inward. The surfaces of detents 82, 84, and 86 are also inclined relative to a tangent to the outer radius of sleeve 72 to carry torque between gear 30 and balls 94, 96 and 98. One or more holes perforated in sleeve 72 are positioned around the periphery of sleeve 72 from the inner to the outer radius thereof, the number of holes being equal in number and equally spaced to register with detents 82, 84 and 86. The holes in sleeve 72 are shown more particularly in FIGURES 5 and 6 at 88, 90 and 92. One or more balls, equal in number to the number of detents 82, 84 and 86, are positioned in said holes 88, 90 and 92, respectively, with clearance between said holes and said balls to engage said detents 82, 84 and 86 and said sleeve 72 to carry torque from gear 30 to sleeve 72 when balls 94, 96 and 98 are in their radially outward position. Cam 60 is positioned adjacent balls 94, 96 and 98 and is adapted to force balls 94, 96 and 98 into engagement with detents 82, 84 and 86 when cam 60 is moved to the right (as shown in FIGURES 3 and 5). In FIGURES 3 and 5, balls 94, 96 and 98 rest upon the radially outward right cylindrical surface 62 of cam 60. Cam 60 is contoured to receive balls 94, 96 and 98 upon right cylindrical surface 64 thereof when cam 60 is moved into its left position, as shown in FIGURES 4 and 6, to disengage sleeve 72 and gear 30.

Hand lever 100 has a yoke 102 at one end thereof which is pivoted about a pin 104 which passes through shaft 40. In one position of lever 100, shoulder 106 of yoke 102 engages shoulder 108 of housing 10. In the position shown in FIGURE 4, shoulder 110 of yoke 102 engages shoulder 108 of housing 10.

In operation, lever 100 is in the position of FIGURES 3 and 5 with the clutch of this invention engaged, or lever 100 is in the position of FIGURES 4 and 6 with the clutch of this invention disengaged.

With the clutch of this invention engaged as shown in FIGURES 3 and 5, lever 100 is in a down position which allows shaft 40 to be moved by spring 46 to the right until shoulder 106 abuts against shoulder 108 of housing 10. If balls 94, 96 and 98 are not in register with detents 82, 84 and 86, cam 66 cannot move into the position shown in FIGURES 3 and 5 but will be positioned on shaft 40 to the left thereof while spring 47 urges collar 50, bearing 56, spacer 58 and cam 60 to the right. The conical transition surface 66 of cam 60 exerts a radial component of force on balls 94, 96 and 98 which causes them to engage detents 82, 84 and 86 when detents 82, 84 and 86 come into register. When detents 82, 84 and 86 register with balls 94, 96 and 98, balls 94, 96 and 98 are forced radially outward by the conical surface 66 which allows spring 47 to push cam 60 to the right into the position shown in FIGURES 3 and 5. Balls 94, 96 and 98 are then locked into position by surface 62 in detents 82, 84 and 86.

When balls 94, 96 and 98 engage detents 82, 84 and 86, torque applied to gear 30 is transmitted through balls 94, 96 and 98 and the bearing surfaces of holes 88, 90 and 92 to cause sleeve 72 to turn with gear 30. Since gear 26 is keyed to sleeve 72, gear 26 also turns with gear 30.

With the clutch of this invention disengaged, as shown in FIGURES 4 and 6, lever 100 is in an up position, with surfaces 108 and 110 in contact, which locks shaft 40 to the left. Cam 60 is turned over the outer race of bearing 56 at 70, whence motion of bearing 56 to the left causes cam 60 to move to the left. When cam 60 moves to the left, cylindrical surface 64 is positioned immediately under balls 94, 96 and 98. Torque on gear 30 forces balls 94, 96 and 98 radially inward to disengage gear 30 from sleeve 72.

Thus the device of this invention is a clutch mechanism which is particularly convenient to manually connect and disconnect a pair of rotating members. If desired, shaft 40 could be moved by means other than handle 100 (for example by an electrical or hydraulic actuator).

It is not intended that the device should be limited by the above description, but only in accord with the spirit and scope of the following claims.

I claim:

1. In combination: a housing; a rod positioned to slide within said housing and spring biased into a first position; the inner race of a first ball bearing being fixed in position on said rod; a plurality of balls positioned between the inner and outer races of said first ball bearing; a barrel cam having two right circular cylindrical surfaces and a conical transition surface therebetween, mounted upon the outer race of said ball bearing, one said cylindrical surface being positioned radially outward relative to the other said cylindrical surface; a rotatable sleeve positioned within said housing coaxial with said shaft, positioned radially outward from said cam, and mounted for rotation relative to said housing, said cam, and said shaft, said sleeve forming at least one radially directed hole perforating said sleeve from the inner radius of said sleeve to the outer radius of said sleeve; a number of balls, equal in number to said perforated holes in said sleeve, each of said balls positioned in a different one of said holes; a rotatable output member attached to said sleeve for rotation therewith; a rotatable input member adapted to slidingly rotate about said sleeve and having at least one detent on the inner periphery of its hub adjacent said sleeve, said detents adapted and circumferentially positioned to engage said balls when said balls are forced through said holes; a spring biasing said shaft and said cam into position to cause said cam to force said balls through said holes into engagement with said detents and with said sleeve to cause said rotatable input member to drive said sleeve and said rotatable output member; mechanical means for moving and locking said shaft, and said cam into a position where the radially inward cylindrical surface of said cam is adjacent said balls to allow said balls to disengage said rotatable input member from said sleeve.

2. A housing, a first shaft positioned to slide along the axis of said shaft within said housing, ball bearing means fixed in position on said shaft, cam means rotatably supported relative to said shaft by said ball bearing means, sleeve means rotatably positioned about said shaft and said cam means and having at least one hole therein, a rotatable member including a hub, at least one detent upon the inner periphery of said hub, said detents being equal in number to said holes and circumferentially spaced about the axis of said shaft to register with said holes, at least one ball equal in number to said holes and said detents positioned in said holes, respectively; spring means to bias said cam in position to urge said balls radially outward through said holes to engage said sleeve and said rotatable member to cause them to rotate together.

References Cited in the file of this patent

UNITED STATES PATENTS

| | | |
|---|---|---|
| 661,479 | Arnold | Nov. 13, 1900 |
| 817,309 | Flynt | Apr. 10, 1906 |
| 1,015,254 | Whisler | Jan. 16, 1912 |
| 2,405,642 | Corte | Aug. 13, 1946 |
| 2,772,578 | Kling | Dec. 4, 1956 |
| 2,913,910 | Gillum | Nov. 24, 1959 |

FOREIGN PATENTS

| | | |
|---|---|---|
| 455,034 | Canada | Mar. 8, 1949 |
| 156,656 | Australia | May 21, 1954 |